US011509692B2

(12) United States Patent
Cohen et al.

(10) Patent No.: US 11,509,692 B2
(45) Date of Patent: Nov. 22, 2022

(54) CREATION AND OPTIMIZATION OF SECURITY APPLICATIONS FOR CYBER THREATS DETECTION, INVESTIGATION AND MITIGATION

(71) Applicant: Cybereason Inc., Boston, MA (US)

(72) Inventors: Rami Cohen, Haifa (IL); Avi Chesla, Tel-Aviv (IL)

(73) Assignee: Cybereason Inc., Boston, MA (US)

( * ) Notice: Subject to any disclaimer, the term of this patent is extended or adjusted under 35 U.S.C. 154(b) by 250 days.

(21) Appl. No.: 16/020,287

(22) Filed: Jun. 27, 2018

(65) Prior Publication Data

US 2019/0020686 A1 Jan. 17, 2019

Related U.S. Application Data

(60) Provisional application No. 62/532,130, filed on Jul. 13, 2017.

(51) Int. Cl.
*H04L 29/06* (2006.01)
*H04L 9/40* (2022.01)
*H04L 41/0893* (2022.01)
*H04L 41/0823* (2022.01)
*H04L 41/14* (2022.01)
*H04L 41/0816* (2022.01)

(52) U.S. Cl.
CPC .......... *H04L 63/20* (2013.01); *H04L 41/0823* (2013.01); *H04L 41/0893* (2013.01); *H04L 63/14* (2013.01); *H04L 41/0816* (2013.01); *H04L 41/145* (2013.01)

(58) Field of Classification Search
USPC .......................................................... 726/1
See application file for complete search history.

(56) References Cited

U.S. PATENT DOCUMENTS

| | | | |
|---|---|---|---|
| 7,774,289 B2 * | 8/2010 | Aniszczyk | G06F 8/61 706/45 |
| 7,933,989 B1 | 4/2011 | Barker et al. | |
| 8,150,783 B2 | 4/2012 | Gonsalves et al. | |
| 8,176,552 B2 * | 5/2012 | Petersen | G06F 21/577 717/168 |

(Continued)

OTHER PUBLICATIONS

The International Search Report and the Written Opinion of the International Searching Authority for PCT/US2015/039664, ISA/RU, Moscow, Russia, dated Oct. 15, 2015.

(Continued)

*Primary Examiner* — Amare F Tabor
(74) *Attorney, Agent, or Firm* — DLA Piper LLP (US)

(57) ABSTRACT

A system and method for optimizing a defense model using available security capabilities are provided. The method includes obtaining a defense model and an optimal security application implementation associated with the defense model; evaluating available security capabilities deployed in an enterprise environment to determine a plurality of variant security applications implementing the defense model; determining a quality score for each of the plurality of the variant security applications; selecting, from the plurality of variant security applications, a variant security application having a highest quality score; and executing the selected variant security application.

17 Claims, 6 Drawing Sheets

(56) References Cited

U.S. PATENT DOCUMENTS

| | | | |
|---|---|---|---|
| 8,495,746 B2* | 7/2013 | Fissel | H04L 63/20 |
| | | | 726/25 |
| 8,572,750 B2 | 10/2013 | Patel et al. | |
| 8,661,499 B2* | 2/2014 | Natarajan | G06F 21/604 |
| | | | 726/1 |
| 8,799,189 B2* | 8/2014 | Schwoegler | G06N 7/005 |
| | | | 706/12 |
| 8,800,045 B2 | 8/2014 | Curtis et al. | |
| 8,813,234 B1* | 8/2014 | Bowers | H04L 63/20 |
| | | | 726/25 |
| 9,111,083 B2* | 8/2015 | Taveau | H04L 9/3231 |
| 9,621,575 B1* | 4/2017 | Jalan | H04L 63/1425 |
| 9,906,539 B2* | 2/2018 | Higbee | G06F 16/35 |
| 9,998,517 B2* | 6/2018 | Meloche | H04L 41/5032 |
| 10,009,380 B2* | 6/2018 | Kinder | H04L 63/20 |
| 10,404,827 B2* | 9/2019 | Evens | H04L 67/16 |
| 10,628,764 B1* | 4/2020 | Kaplan | H04L 63/1433 |
| 2004/0114519 A1 | 6/2004 | MacIsaac | |
| 2004/0143756 A1 | 7/2004 | Munson et al. | |
| 2012/0096549 A1 | 4/2012 | Amini et al. | |
| 2012/0304007 A1 | 11/2012 | Hanks et al. | |
| 2013/0198840 A1 | 8/2013 | Drissi et al. | |
| 2013/0276122 A1 | 10/2013 | Sowder | |
| 2014/0215618 A1 | 7/2014 | Amit | |
| 2014/0283026 A1 | 9/2014 | Amit et al. | |
| 2014/0283050 A1 | 9/2014 | Amit | |
| 2014/0337974 A1 | 11/2014 | Joshi et al. | |
| 2015/0139074 A1* | 5/2015 | Bane | H04W 24/08 |
| | | | 370/328 |
| 2016/0070626 A1* | 3/2016 | Raghavendra | G06F 11/1464 |
| | | | 726/26 |

OTHER PUBLICATIONS

The International Search Report and The Written Opinion of the International Searching Authority for PCT/US2015/060109, ISA/RU, Moscow, Russia, dated Mar. 10, 2016.

* cited by examiner

CREATION AND OPTIMIZATION OF SECURITY APPLICATIONS FOR CYBER THREATS DETECTION, INVESTIGATION AND MITIGATION

CROSS-REFERENCE TO RELATED APPLICATIONS

This application claims the benefit of U.S. Patent Application Ser. No. 62/532,130 filed Jul. 13, 2017, which is hereby incorporated by reference for all that it contains.

TECHNICAL FIELD

The present disclosure relates generally to cyber security systems, and more particularly to real-time creation and optimization of security applications utilized in such systems.

BACKGROUND

The frequency and complexity level of cyber-attacks has increased with respect to attacks performed against cloud providers, enterprises, organizations, network carriers, and the like (collectively referred to as "enterprises" or "enterprise"). Some complex attacks, known as multi-vector attack campaigns, utilize different types of attack techniques and target network, servers and end point applications in order to identify at least one weakness that can be exploited to achieve the attack's goals, thereby compromising the entire security framework of the network.

To secure their systems, infrastructure, and services, enterprises utilize many different security products provided by different vendors. Typically, such products are utilized to detect and/or mitigate different vulnerabilities or threats. As an example, an enterprise network can implement one security product for an intrusion detection system (IDS) and another product for detecting malware download. Particularly, a typical enterprise network will be protected by a set of security services that may include firewalls, anti-virus software, malware detection software, authentication and authorization systems, intrusion detection, anti-phishing systems, network and end point behavior analysis, data leak prevention systems, web application firewalls (WAFs), and so on. The security products are typically deployed in different segments of the enterprise network, e.g., at different servers, end-points (client computers), networks, and so on. Further, similar products from different vendors, can typically be utilized in combination to enhance security.

The complexity of security systems requires expertise in configuring and orchestrating the various components of a security system. In particular, to allow proper operation of such systems, a defense model has to be defined against a particular cyber threat. Specifically, a defense model defines, among other things, the system's components (security capabilities) to optimally detect investigate and mitigate the threats. The model also defines the correlation rules between security events and the investigation and mitigation actions that should be executed. The detection, investigation, and mitigation would require monitoring, classifying, and correlating attack logs from multiple security products.

However, still complex attacks are frequently successful because modern security systems are not sufficiently orchestrated, in and agile and adaptive manner with respect to detection, investigation and mitigation of such evolving threats. Current security systems cannot easily and promptly adapt to detect and mitigate new attack (threat) behavior, or attacks that change their behavior in a significant manner.

To improve responsiveness to cyber threats, an attempt is made to share and collaborate on information regarding threats and vulnerabilities. Such a collaboration potentially may allow security subject matter experts to analyze it and then to define prevention actions and configurations against some of the basic, and single vector attacks. However, currently there are no solutions that allow efficient collaboration and timely execution of advanced defense models against multi-vector advanced attack campaigns and threats. One of the reason for this deficiency is the architecture of the security systems.

As noted above, a security system to protect an organization is a myriad of security products, with various security capabilities, by different vendors. Each such product has a unique interface and implements a different type of technology, configurations, debug methods, different security rules, and logs. The myriad of different security solutions and, specifically, their security rules pose a great challenge to protecting an enterprise network from cyber-attacks. In addition to the complexity in configuring and mainly in monitoring the different solutions, there is a real challenge in understanding the effectiveness of each security rule and, consequently, each solution. That is, it cannot be easily determined which solution, for example, is better over the other to detect a specific type of threat.

As such, currently there is no solution that can automatically adapt the defense model to work optimally according to the existing security capabilities (e.g., products by various vendors) in each environment. Thus, each organization, based on the security threat information, need to determine and builds its own defense models and its own procedures for (automatically, or manually) orchestrate the tools deployed in his organization to effectivity detect and mitigate the cyber threats. This process often requires human expertise and time, thereby significantly increasing the time to detect and the time to respond to attacks.

Another deficiency with existing solutions is that such defense models and procedures are not agile to changes in the security capabilities. For example, a failure of a single security product may break the defense model and prevent the detection and/or mitigation of a cyber threat.

Furthermore, the current management, configuration, monitoring and orchestrating of various security products in the organization is a complex task and typically requires months of programming work to accomplish. As a result, current solutions for protect large scale enterprise networks are not easily adaptable to protect against ongoing security threats.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for optimizing a defense model using available security capabilities. The system comprising obtaining a defense model and an optimal security application implementation associated with the defense model; evaluating available security capabilities deployed in an enterprise environment to determine a plurality of variant security applications implementing the defense model; determining a quality score for each of the plurality of the variant security applications; selecting, from the plurality of variant security applications, a variant security application having a highest quality score; and executing the selected variant security application.

Some embodiments disclosed herein also include a system for optimizing a defense model using available security capabilities. The system comprising a processing circuitry; a memory coupled to the processing circuitry, the memory contains therein instructions that when executed by the processing circuitry configure the system to: obtain a defense model and an optimal security application implementation associated with the defense model; evaluate available security capabilities deployed in an enterprise environment to determine a plurality of variant security applications implementing the defense model; determine a quality score for each of the plurality of the variant security applications; select, from the plurality of variant security applications, a variant security application having a highest quality score; and execute the selected variant security application.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
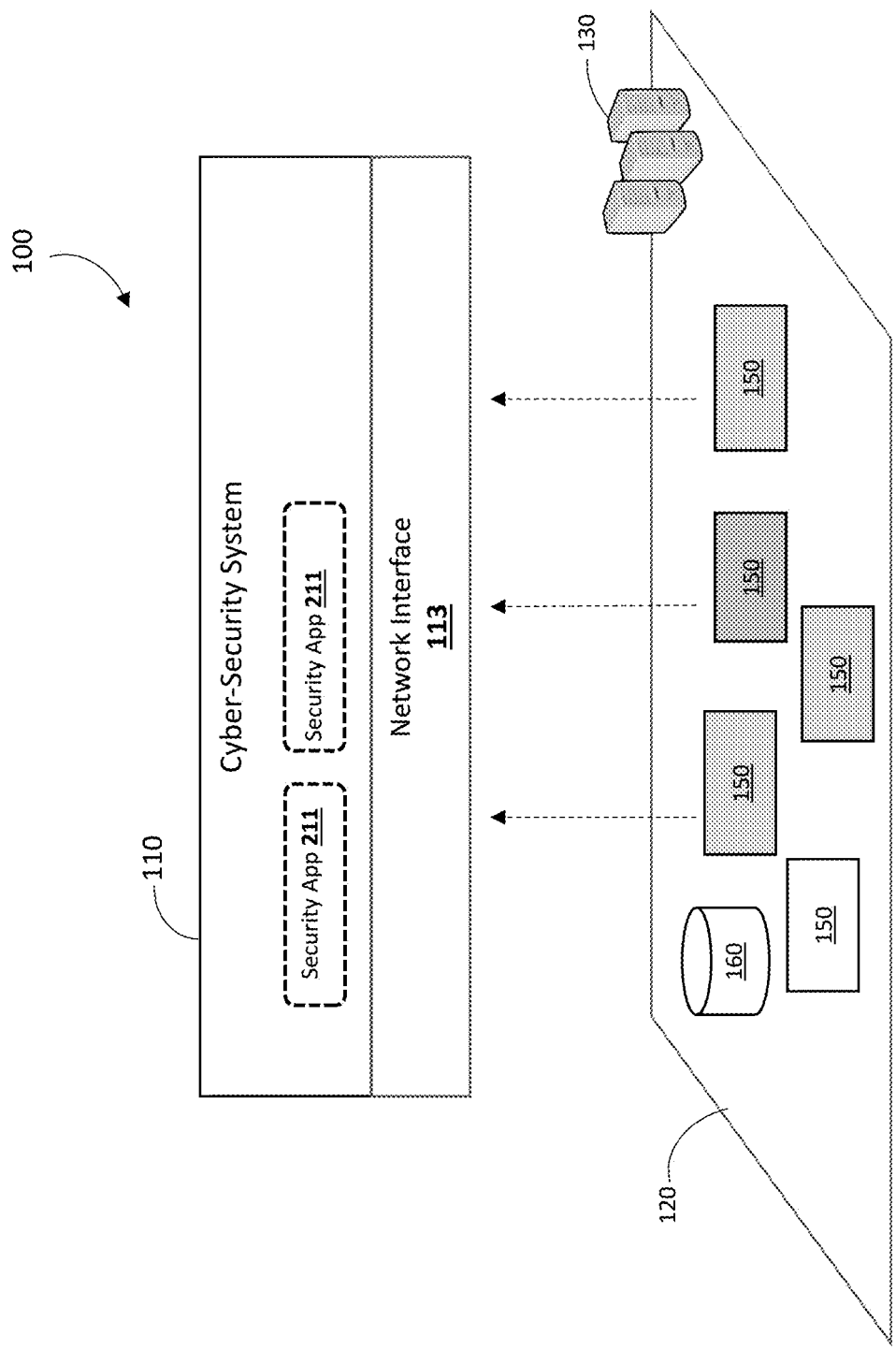
FIG. 1 is an example diagram illustrating the deployment of a cyber-security system in an enterprise environment demonstrating the operation of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a method and system that allows for creating and optimizing security applications in real-time are provided. A security application is an implementation of the defense model using a set of security products. A security application is created and/or optimized based on a defense model. The defense model defines the optimal defense behavior with respect to a certain threat.

In an embodiment, a deployed and operable security application is monitored to determine if such an application is fully optimized to implement the defense model based on the currently available set of security products in the organization. Therefore, according to the disclosed embodiments, in a case of temporary failure, dysfunction of one or more security products, or lack of required security functionality in one or more of the existing security products, a security application can be dynamically adapted to fit a current set of available products, ensuring that the enterprise is protected also when there are failures.

In another embodiment, the defense models and the security applications are agnostic to any type of a security product (device and/or service) deployed in the enterprise. As such, the defense models and security applications can be shared across different security applications deployed in different enterprises.

FIG. 1 is an example diagram illustrating the deployment of a cyber-security orchestration system 110 in an enterprise environment 100 demonstrating the operation of the disclosed embodiments. The enterprise environment 100 may include, for example, cloud providers, enterprises, organizations, business, network carriers, and the like.

The cyber-security orchestration system 110 (or the "system 110") is configured to protect an entity (hereinafter a "protected entity") 130 communicatively connected in a network 120. The network 120 may be, but is not limited to, a virtualized network, a software defined network (SDN), a hybrid network, a cloud services network, or any combination thereof. In an embodiment, the cyber-security system 110 is configured to operate in detection, investigation, and mitigation phases.

In an example configuration, the cyber-security system 110 is configured to control and execute the various phases to protect the protected entity 130. Specifically, the cyber-security system 110 is configured to create, control, program, and execute a plurality of security applications (collectively labeled as "security app 211").

The security applications 211 can be downloaded from a central repository 160, which may be connected to the system 110 through a network, such as but not limited to, the network 120. In an embodiment, the central repository 160 stored a plurality of security applications and defense models that can be shared among a plurality of cyber-security systems. That is, a security application 211 executed by the system 110 can be stored in the repository 160 and later utilized by a different cyber-security platform.

In an embodiment, the system 110 includes a classifier (not shown in FIG. 1) utilized to classify a plurality of attack protection rules and alerts of the various security products to the security services and security engines realized through the system 110. The operation of the system 110 is discussed in greater detail herein below.

In an embodiment, the system 110 further includes a network interface 113 configured to provide an interface layer for the system 110. Such communication can be with SDN-based network elements or "legacy" network elements (not shown) in the network 120. The network interface 113 supports bi-directional communication drivers to allow communication with the data-plane elements including configurations, policy read, logs collection and API calls to query data repositories (logs DBs). The drivers support different forms of communication standards and vendor-defined interfaces such as Netconf, Netflow, BGP, BGP flow spec, SSH, CLIs, DB APIs and more. The drivers enable communication with middle-box devices (e.g., L4-L7 devices, DPI devices), end point devices (mobile, host-based security applications), server applications, management systems of these devices, other data repositories (e.g., elastic search DB) and so on.

The network interface 113 also interfaces with a plurality of security products 150 deployed in the enterprise environment 100. A security product 150 collectively referred to a product, device, service and the like that implement a security function to detect, investigate or mitigate a cyber threat. A security product 150 may maintain an attack database (not shown in FIG. 1) including security rules. As noted above, the security rules typically include attack signatures, malware and virus file patterns, malware OS related operation patterns and the like to detect a threat, mitigate a threat, or both. An attack database is frequently updated with new rules, modified rules, or both in order that the rules will be updated with the most recent threat intelligence about attack campaigns, new version of malware and viruses, and so on.

Following are non-limiting examples for cyber-solutions and associated rules stored in their attack databases. The cyber-solution is an anti-virus system and the respective security rules may include virus file patterns generated by anti-virus products, such as those provided by McAfee®, Symantec®, Blue Coat®, and the like. The cyber-solution is an Integrated Project Services (IPS) or intrusion detection system (IDS) and the respective rules are network attack signatures generated by products such as those provided by Source Fire® (Cisco), McAfee®, Snort®, and the like. The cyber-solution is an anti-malware system and the respective rules are known anti-malware file patterns and OS related malware action-patterns as provided by tools such as, but not limited to, FireEye®, Lastline®, and the like.

During runtime, a security product 150 generates attack logs identifying activity (malicious or non-malicious) detected in the network 120. An attack log is typically in a structured format that may vary from product to product. For example, a single log (e.g., file) may contain identified hosts, users, network address and the type of activity (e.g., event) detect by the security product 150. The attack logs are generated and input to the system 110 at runtime, i.e., when a security product 150 is active in detecting, investigating, or mitigating an on-going attack, or a combination thereof.

The system 110 is configured to orchestrate the operation of the various security products 150 through execution of a plurality of security applications 211. According to the disclosed embodiments, the system 110 is configured to create the applications 211 and modified the applications 211 in real time to provide an optimal protection against threats at any given time. The optimal protection is achieved by creating a security application utilizing available products 150 having the highest score in defensing against a particular threat.

For example, if two or more security products 150 are deployed to protect the entity 130 against the same threat (e.g., spyware or ransomware malware), either only one product having the highest performance score will be selected for activating the protection for that purpose at a time or only logs associated with this threat from one product will be taken into account. In another embodiment, the orchestration system 110 may collect all logs, and prioritize such logs based on the performance score associated with the product that generated a respective log. The selection is based on a performance score, or scores generated or otherwise computed for each security product 150 and predefined selection criteria. In an embodiment, the weighting or prioritization of such logs is also based on is based on a performance score.

The performance score includes any of an offline score, a runtime score, a unified score, or a combination thereof. An offline score is based on the security-rules defined in an attack database (not shown) of a respective security product 150. As such attack database is typically populated with rules, the score can be computed as an off-line process and not based on the runtime operation of the product 150. It should be noted that, as the security rules in an attack database are updated, added, or removed, a new off-line score can be generated or computed. A runtime score is generated based on attack logs provided by a security product 150. A unified score is at least based on the off-line and run-time scores.

It should be noted that, for some security products 150, only a runtime score can be generated or otherwise computed. As an example, for a security product 150 having an attack database containing security rules that frequently change, an off-line score will not be generated.

In an embodiment, the system 110 includes the classifier (not shown in FIG. 1) utilized to classify a plurality of attack protection rules and alerts of the various security products, and raw logs (e.g., Domain controller logs, DNS logs etc.) generated by the network infrastructure, to the security services and security engines realized through the system 110. The operation of the system 110 is discussed in greater detail herein below with respect to FIG. 2.

In an embodiment, the system 110 is configured to determine the intent of a detected cyber threat (new or existing) and create a defense model that can handle the threat. The defense model, when applied, can be dynamically adapted based on the available security product (devices and services). In an embodiment, the intent of a cyber threat can be detected based on a risk chain mechanism. An example for such a mechanism is disclosed in U.S. patent application Ser. No. 15/239,258, assigned to the common assignee and it is hereby incorporated by reference for that it contains.

In an embodiment, the defense model and the security application are agnostic to any type of a security product (device and/or service) deployed in the enterprise. As such, the security application can act on any log, signal, and/or event received from such products.

In an embodiment, products defined in the defense model are selected based on a score determining how good a security product performs in protecting against threat types. Thus, the defense model can be adapted to select a specific product that would provide optimal defense against a specific type of threat.

In an example embodiment, the defense model, and hence the security application provides a unified abstract representation that is agnostic to the security products used for detection and mitigation of a threat. Thus, a security application created using the disclosed embodiment can be utilized to protect the overall enterprise network without being dependent on a specific security product (e.g., product). That is, one security product can be replaced by another without changing or reconfiguring such a security application. Furthermore, the defense model, and hence the security application being agnostic to a specific system or infra-structure, can thus be easily collaborated and utilized to protect other enterprises with little to no modifications.

According to the disclosed embodiments, the system 110 is configured to first receive or otherwise generate a defense model. In order to generate a defense model, the system 110 is configured to determine an intent of a detected cyber threat (new or existing) and create a defense model that can handle the threat. The defense model provides a reference to an optimal (base) security application that would provide the best protection against the protected entity 130. In one embodiment, the defense model can be saved in the central repository 160.

Then, the system 110 is configured to determine the currently available security capabilities (in the environment 100) and their performance scores. As will be discussed below, the security capabilities include security engines operable in the system 110. Each such engine is associated with a security product 150. Thus, a performance score is of a security product.

The system 110, is further configured to create at least one new security application based on the defense model and the available security capabilities. The at least one new security application is a variant of the base security application (defined through the defense model). In an embodiment, a variant having the highest quality score among all the at least one new application is deployed and executed.

Execution of a security application is performed by the system 110 by processing events and/or signals generated by the various products 150 according to one or more correlation (workflow) rules, and/or according to a risk-chain model that identify cause-and-effect correlation between the events, automatically. The processing of events and signals are performed by security services and engines (discussed below) which are configured with the security application.

Continuously or periodically during the execution of a security application, the changes in the security capabilities may be monitored. Any change that effects the executed application, as detected through the monitoring, can trigger a customization of the application so it can be optimized to the current available capabilities. Therefore, in a case of a temporary failure or dysfunction of one or more security products, an application 211 can be dynamically adapted to fit a current set of available security capabilities, ensuring the continuous defense of the protected entity 130. Any new applications or an optimized variant thereof can be saved in the central repository 160.

It should be emphasized that in addition to replacing a new (optimized) variant of a security application with an existing variant in the case of a failure or dysfunction of a security capability, or lack of security capability, the replacement can be also made in other cases as well. In particular, the replacement can be made if a better capability is now available. In another embodiment, a monetization factor can be utilized. The utilization of the monetization factor can be expressed as what are the best alternative set of available capabilities that provides the optimal protection as defined in the defense model.

In an embodiment, a variant of a base security application can be retrieved from the central repository 160, if such exists. A determination if such a variant exists is determined in part, based on, the available capabilities and the defense model.

Figure 2:
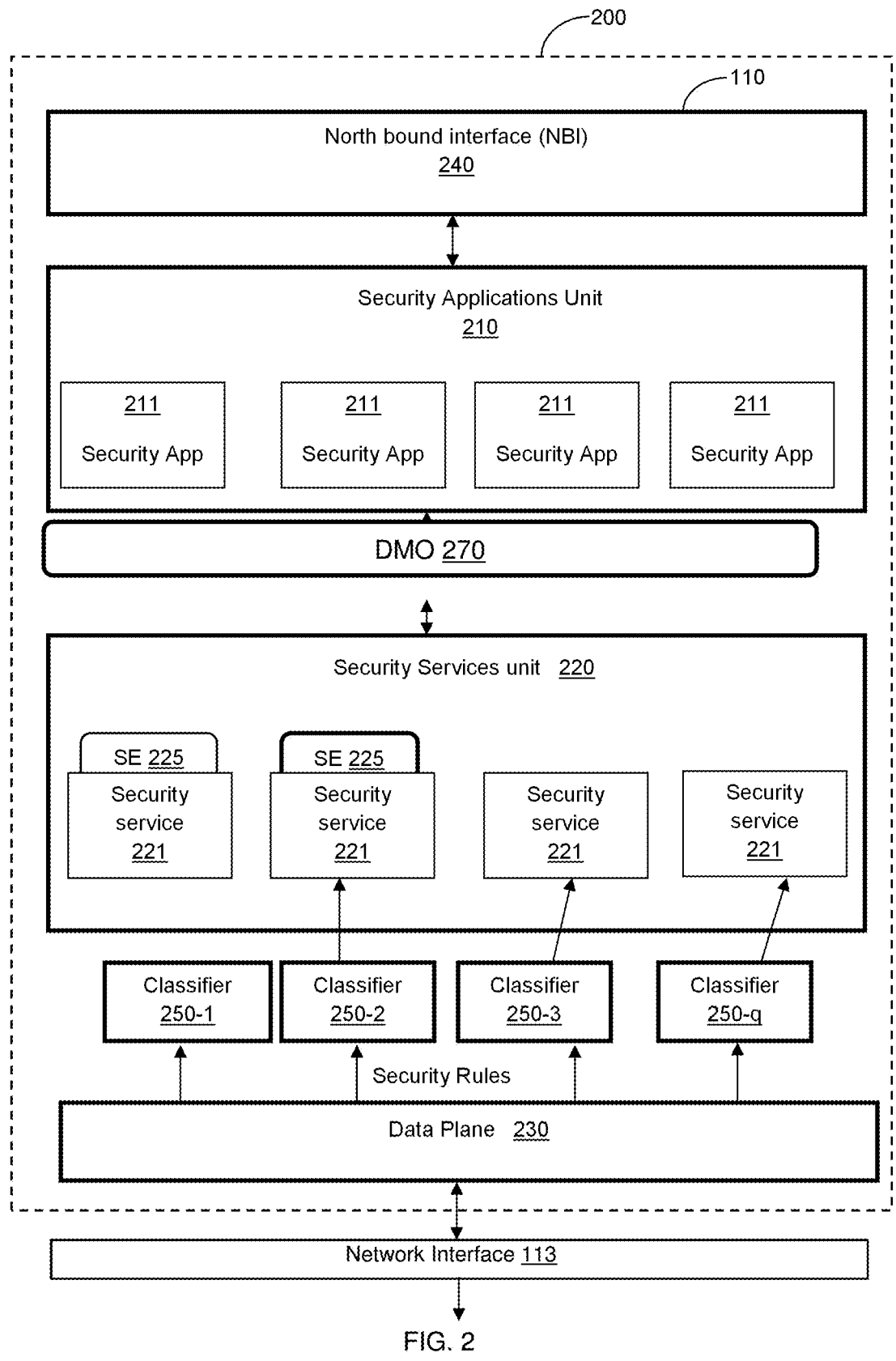
FIG. 2 is a diagram of a security stack implemented by the cyber-security system according to an embodiment.

FIG. 2 shows an example block diagram of a security stack 200 implemented by the system 110 according to an embodiment. In an example configuration, the security stack 200 includes a security applications unit 210, a security services unit 220, a data-plane unit 230, a northbound interface (NBI) 240, and a defense model optimizer (DMO) 270. The security stack 200 also includes security services 221 that are reusable across different security applications ("apps") 211. Thus, different security applications 211 (each security application 211 typically configured for a different purpose) can consume the same security services 221 for their own needs.

Specifically, the security applications unit 210 includes one or more security applications 211. Each security application 211 represents a different type of security protection including, for example, ransomware attack campaign detection and mitigation, intelligence gathering detection and mitigation, insider threat detection and mitigation, data-leaks, and so on. The modules or rules interfacing with a security application 211 provide the required services and security engines 225, thereby allowing the creation or otherwise updating of a security application 211 according to evolving security needs.

The security services unit 220 includes different types of security services 221. Each security service 221 is designed to serve one or more security applications apps) 211. The security services 221 are also designed to provide efficient control and security data collection over security rules and logs provided by the security products (150, FIG. 1). The classification of the security rules and logs into the services 221 and one or more security engines (SEs) 225 of the services 221 is performed by corresponding classifiers 250 as discussed in detail below. Each security service 221 may include one or more preconfigured security engines 225.

Following are example security services 221 that can be maintained and executed by the security services unit 220. A first type of security service manages the products of network behavior analysis (NBA) products. Such service classifies the logs and/or rules of NBA products into a uniform set of protection functions (security engines) that typifies NBA technologies such as abnormal data transfer, network scanning, application scanning, brute force attack behavior malware propagation, etc.

Another type of security service 221 allows for managing and analyzing multiple types of reputation sources (third party intelligence security sources). The reputation database maintains reputation information of network entities such as clients and services (sites). Such reputation information may be used to evaluate if these entities can possess a threat. A threat may be, for example, a phishing site, a command and control site, drop zone servers, sites that include malware software, and the like. The service classifies security capabilities of threat reputation feeds into a uniform set of protection functions (Security engines) such as phishing, C&C, drop-point, malware sites, and so on.

Another type of security service 221 allows for control of multiple types of anti-malware products in the network in order to analyze content such as web objects, mail attachments, executable files, and so on; and to identify anomalous code behavior. This service classifies security logs of anti-malware (such as sand-box, network and endpoint AVs) products into a uniform set of protection functions (Security engines) that typifies these security technologies such as ransomware, droppers, memory scrapers, client spyware, etc.

Yet another type of security service 221 allows for management of multiple IDS and IPS devices. This service classifies security capabilities of IDS and IPS products into a uniform set of logical protection functions such as network scans, authentication brute-force, privileges escalation, malware, Command and control (C&C), a DoS, data-leak network patterns, and so on.

Some or all of the security services 221 may operate with a security engine 225. A security engine 225 is configured with a set of engine rules, either manually or automatically. In some cases, a user can modify and program new security engines 225 by defining a new set of engine rules.

Yet another type of security service 221, which collect signals from all other services, generates real-time (RT) attack risk-chain patterns. These real-time attack risk-chain patterns represent cause-and-effect relationships between the various security signals collected from the security services. The risk chain pattern represents the overall "attack story", the stage and the intent of the attack such as ransomware attack campaign, data-leak, and so on. These real-time attack risk-chain patterns can be used for real-time triggering of investigation and mitigation actions against the threats.

It should be noted that programmability of the security stack 200 of the system 110 allows a user to select different types of security services 221 and security engines 225, thereby providing a mix and match capability. Specifically, this capability is achieved by the security services 221, data plane unit 230, the classifiers 250, and a network interface module 113, all together which provides an abstraction layer for all underlining data-plane security products in the network and for threat intelligence DB (such as IDS, IPS, Anti-malware, NBA, reputation DB, WAF, and so on).

Information that is needed for operation of the security services 221 may be retrieved from the data-plane unit 230, from the north bound interface 240, or from both. It should be noted that the security services 221 in the security services unit 220 also communicate and interface with the security applications unit 210.

It should be further noted that the security services 221 listed above are merely examples, and that other security services can be utilized in the cyber-security system without departing from the scope of the embodiments disclosed herein. In various non-limiting embodiments, a programming language is provided in order to allow users to create and modify security applications and to create and modify the security engines included in each security service, as per business needs.

The data-plane unit 230 provides various functions that allow the security services to both analyze network information and enforce different control actions. Various services provided by the data plane unit 230 include topology discovery, data collection, QoS, and traffic copy and redirection services which include traffic distribution (L2, L3 load balancing for scaling out network products), identity management service and so on.

Topology discovery involves interacting with the data-plane network elements, SDN controllers, and orchestration systems in order to retrieve network topology information.

The traffic copy and redirection services are designed to manage all network traffic redirection functions which include, but are not limited to, traffic redirection, smart traffic copying (copy based on L2-L4 traffic filter parameters), traffic distribution, and so on.

The data collection may involve collecting statistics data from probes deployed in the network and storing such statistics. The statistics collection may include, but are not limited to, network-based statistics from network elements; application-based network statistics from DPI products (including middle-boxes and servers); and user-based statistics from network, DPI, middle boxes, and end-point products. The collector services normalize the statistical information into a format that can be analyzed by the security services 221 in the security services unit 220. The QoS function involves interacting with a network and L4-L7 devices in order to enforce, for example, traffic rate-limiting. An identity management function involves interacting with identity management systems to provide name resolution services for the security services, map IP addresses to host, provide user names, and the opposite.

Also included in the security stack 200 are a plurality of classifiers 250-1 through 250-$q$ (hereinafter referred to individually as a classifier 250 and collectively as classifiers 250, merely for simplicity purposes) communicatively connected to the security services unit 220. Each classifier 250 is configured to classify security rules and attack logs of different security products related to the same category of a cyber-solution to a respective security service 221 and its security engines 225. For example, a cyber-solution of an IDS with a "network scan" protection would be an option. Thus, all security rules and/or logs related to a network scan type of threat of the different security products are classified to the same service and a network scan security engine of this service. It should be noted that one security rule or attack log can be classified to one or more security services 221 and engines 225 and thus become processed by one or more classifiers 250.

In an embodiment, each classifier 250 is configured to normalize the security rules, attack logs, or both, to a unified representation. In another embodiment, such normalization is performed by the network interface 113. The operation of a classifier 250 is discussed in greater detail in a U.S. patent application Ser. No. 15/227,571 assigned to the common assignee and it is hereby incorporated by reference for at that it contains.

The north bound interface 240 interfaces between the system 110 and one or more external systems (not shown). The external systems may include, for example, third party security analytics systems, security portals, datacenter orchestration control systems, identity management systems, or any other system that can provide information to the security stack. This enables wider context-based security decision making processes. In an embodiment, the interfaces 240 may include standard interfaces, such as CLI, REST APIs, Web user interfaces, as well as drivers that are already programmed for control, configuration, or monitoring of specific third-party systems, a combination thereof, and so on.

According to the disclosed embodiments, the DMO 270 is configured to create and customize security apps 211, such that the apps would best fulfill the defense models. As noted above, a defense model is defined by a user (e.g., a security expert, an administrator, and the like). As further noted above, the defense model is expressed by a base security application, that when executed by the system 110, would provide the best defense behavior. A security application 211 is a set of security engines (SEs) 225 and at least one correlation rule, that is defined manually, or automatically by a risk-chain service. The correlation rule defines one or more logical operators to be applied on the security engines 225.

According to an embodiment, a defense model is received (e.g., uploaded to, saved in, or generated in the system 110). Then, the available security engines 2250 and the scores of their respective security products is determined. In one configuration, each security engine 225 is associated with a security product(s) that can handle a specific threat.

The operation of scoring security products is performed by each security engine 225 operable in a service 221, designed (the service) to handle a specific cyber-solution category. For example, a security service 221 for an IDS can be configured with 3 different security engines, each of which handles a different threat (e.g., privileges escalation, a network scan, and a brute-force attack). Each engine 225 is configured to score the performance of each product (e.g., products provided by Source Fire®, McAfee®, Snort®, etc.) deployed in the network and configured to handle the respective type of threat.

The scoring is performed based on a product profile (not shown in FIG. 2). The product profile includes all classified security rules of a specific product. The classified rules are in a unified format across the different products. Thus, the scoring is agnostic to a specific representation of product. The operation of a security engine 225 is further discussed herein below with reference to FIG. 5.

If a security engine 225 is not available, then there is no operable product (150, FIG. 1) that supports the needed functionality. For example, if a McAfee®'s network scan functionally is not configured, or not functioning, the respective security engine 225, then would be identified as not available. In an embodiment, all available security engines 225 and their respective scores are maintained in a table (or other types of data structures) in the DMO 270.

The DMO 270 is configured to perform an analysis of the defense model. The analysis is performed, in part, to create a variant of the base security application that would best match the defense model. A base security application is a security application that matches the requirements defined in the security application.

Figure 3:
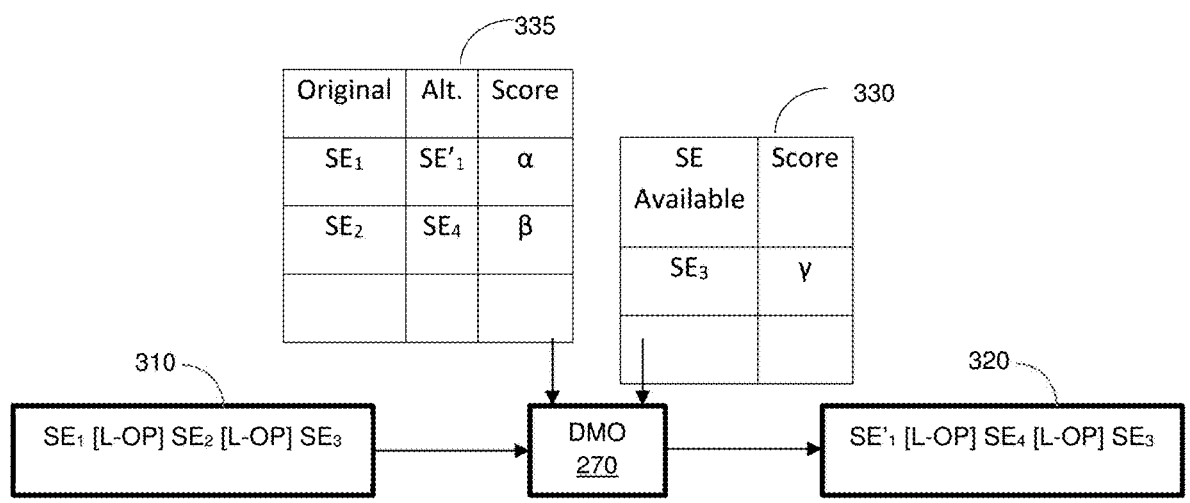
FIG. 3 is a schematic diagram illustrating a base security application and a variant of the base security application generated thereof.

In an embodiment, as an abstract example shown in FIG. 3, a defense mode, and hence its respective base application 310 may require the engines $SE_1$, $SE_2$, $SE_3$ (each of which describes a different capability). A capabilities table 330 indicates the available engine is only $SE_3$. A mapping table 335 lists $SE'_1$ and $SE_4$ as alternatives to $SE_1$ and $SE_2$, respectively, each of which is designated with its respective quality score. Thus, a newly created security application 320 would include the engines $SE'_1$ $SE_4$, and $SE_3$. The operation annotated in FIG. 3 as "L-OP" indicates any logical operator.

The newly created security application is added to the unit 210 and executed therein. In an embodiment, a notification is sent to a user about the creation of the new application, its deployment, and/or execution, the root-cause for creating the new application such as, but not limited to, a product is missing, or a functionality within a product is missing, product failure, and so on. This allows the user to prevent or approve these actions.

For each application, the DMO 270 is configured to monitor the operation of the security engines 225 to determine any changes in their operational status. Any changes would trigger optimization of the security application based on the current available security engines.

Referring back to the example in FIG. 3, if a $SE_3$ is not functioning, but $SE_2$ is available, then the security application 320 can be optimized to include the engines $SE'_1$ and $SE_2$, resulting in a new application 330.

It should be noted that the DMO 270 is configured to perform the selections and replacement of security engines to comply with the logic structure of the security applications, and specifically with the correlation rules defined between security engines (manually or automatically by a risk-chain service). The correlation rules define a relationship among the security engines and their generated events. The logical operators may include, for example, OR, AND, XOR, NOT, IF-THEN, and the like.

In an embodiment, to create a fully functional and optimized security application, first the DMO 270 identifies missing security engines, i.e., engines that are required in the base application, but are not available. Then, for each such missing engine an alternative replacement engine is selected.

In an example embodiment, the selection is made using a mapping table. The mapping table also includes a quality score, which is compared according to the respective engine. As an example, the score may be between 0 and 1 determining how close (in terms of the application quality) the alternative engine is to the original (missing) engine. The quality score can be a function of a number of factors, such as performance scores of the original and alternative engine, the application type, an operating environment (e.g., an operating system), and the like.

Table 1 shows an example for a mapping table utilized by the DMO 270.

TABLE 1

| Original Security Engine | Alternative Security Engine | Quality score |
|---|---|---|
| IDS brute force | NBA brute force | 0.8 |
| IDS malware activity | Reputation C&C | 0.5 |
| IDS Data Exfiltration | NBA abnormal data transfer | 0.6 |

As demonstrated in Table 1, the alternative for a missing "IDS brute force" security engine is the "NBA brute force" engine having a quality score of 0.8. Thus, replacing the IDS brute force engine with a "NBA brute force" engine reduces the quality of the application. As further demonstrated in Table 1, the "IDS malware activity" engine may be replaced with the "Reputation C&C" engine. Also, the "IDS Data Exfiltration" can be replaced with the "NBA abnormal data transfer" engine. It should be noted that security engines listed in Table 1 are merely examples and multiple alternatives (each with different score) for each original security engine can be utilized.

In an embodiment, the mapping table may be (adaptively) adjusted based on the performance results of the security applications utilizing the alternative security engines. That is, in case the "hits" (attack logs that match the engine) are high for one or more applications with the same alternative engine, then the DMO 270 may increase the quality score of that engine. In a similar fashion, in case of "misses" by one or more applications with the same alternative engine, then the DMO 270 may decrease the quality score of that engine. In another embodiment, the score of an engine is the signal to noise ratio (SNR) of the engine. The SNR of engine is defined as the number of events generated in the past and that successfully correlated with other events versus the number of events generated by the engine and were not correlated with other events.

In some embodiments, the mapping table is a matrix where a single original (missing) engine is mapped to two or more alternative engines. Such a matrix can represent the engines in the order that and the logical operator to connect the two or more alternative engines. As an example, a "IDS data exfiltration" security engine may be replaced with both "NBA abnormal data transfer" and "NBA drop zone" security engines, correlated with an OR operator.

Upon selecting an alternative security engine, the DMO 270 performs a replacement process to replace such engine with the missing security engine. The replacement is performed in a way that maintains the required logical structure of the base application. In an embodiment, this includes placing the alternative security engine in the same place in the chain as the original security engine (that should be replaced).

For example, a security application ($app_1$) is defined through the using the following security engines and correction rule:

$app_1 \rightarrow SE_1 \text{ } _{OR} \text{ } SE_2 \text{ } _{OR} \text{ } SE_3 \text{ } _{AND} \text{ } SE_4$ the variant of $app_1$ is $app_2$ where $SE_2$ and $SE_3$ are replaced with the alternative engines $SE'_2$ and $SE'_3$.

$app_2 \rightarrow SE_1 \text{ } _{OR} \text{ } SE'_2 \text{ } _{OR} \text{ } SE'_3 \text{ } _{AND} \text{ } SE_4$ In an embodiment, any missing security engines that cannot be replaced with an alternative engine(s) should be removed from the application while maintaining the required logical structure. The removal process is different for different logical operators. In an example embodiment, a missing engine connected through an OR operator to the other engine(s) is simply removed from the chain. For example, if $SE_2$ is missing that the variant of the base application ($app_1$) may be:

$app_2 \rightarrow SE_1 \text{ } _{OR} \text{ } SE_3 \text{ } _{AND} \text{ } SE_4$ It should be noted that that the removal of an engine connected with an OR operator is performed in order to increase the quality score of the entire application (app_score). An embodiment to compute the app_score is discussed below.

In another example, when two engines are connected through an AND operator, IF-THEN, AND with cross events, the mere removal of the engine can break the logical structure of the security application. In particular, events or signals (processed the missing engines) should be handled. For example, when two security engines are connected with the 'AND' operator and the second engine is chained with the first engine (e.g., the source host of the second engine is equal to the destination host of the first engine), then removing the first engine may prevent associated events from being detected by the second engine with the attack. To this end, the DMO 270 is configured to add logic rules to bridge the gap caused by removing a missing security engine. For example, one method to optimize the application in this case will be to remove the AND condition and alert the user about it.

Upon completing the creation of a new security application, an app_score is computed by the DMO 270 for each new application. In an embodiment, the app_score is the product of all quality scores of all engines in the application. For example, if an application implements only the 3 alternative engines listed in Table 1, the app_score would be (0.8*0.5*0.6=0.24). The higher the quality score, the better the quality of the security application. In an embodiment, only security applications having an app_score over a predefined threshold are deployed, executed, and/or saved in the central repository 160 as shown in FIG. 1.

It should be noted that other methods can be used to compute the app_score without departing from the disclosed embodiments. Such methods may include, for example, average, weight average, and the like.

It should be noted that each of the security applications unit 210, the security services unit 220, the data plane unit 230, the north bound interface 240, the classifiers 250, and the DMO 270, are communicatively interconnected through a predefined set of interfaces, APIs, or a combination of interfaces and APIs. It should be further noted that, in an embodiment, the security application unit 210, the security services unit 220, the data plane 230, the classifiers 250, and the DMO 270 230 in the security stack 200 are independent. Thus, any changes in one unit or module do not necessarily result in any changes to the other modules.

Each, some, or all of the modules and the various units, modules and components of the security stack 200 may be realized by a processing circuity (not shown). The processing circuitry may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuity (not shown) may also include machine-readable media (not shown) for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 4:
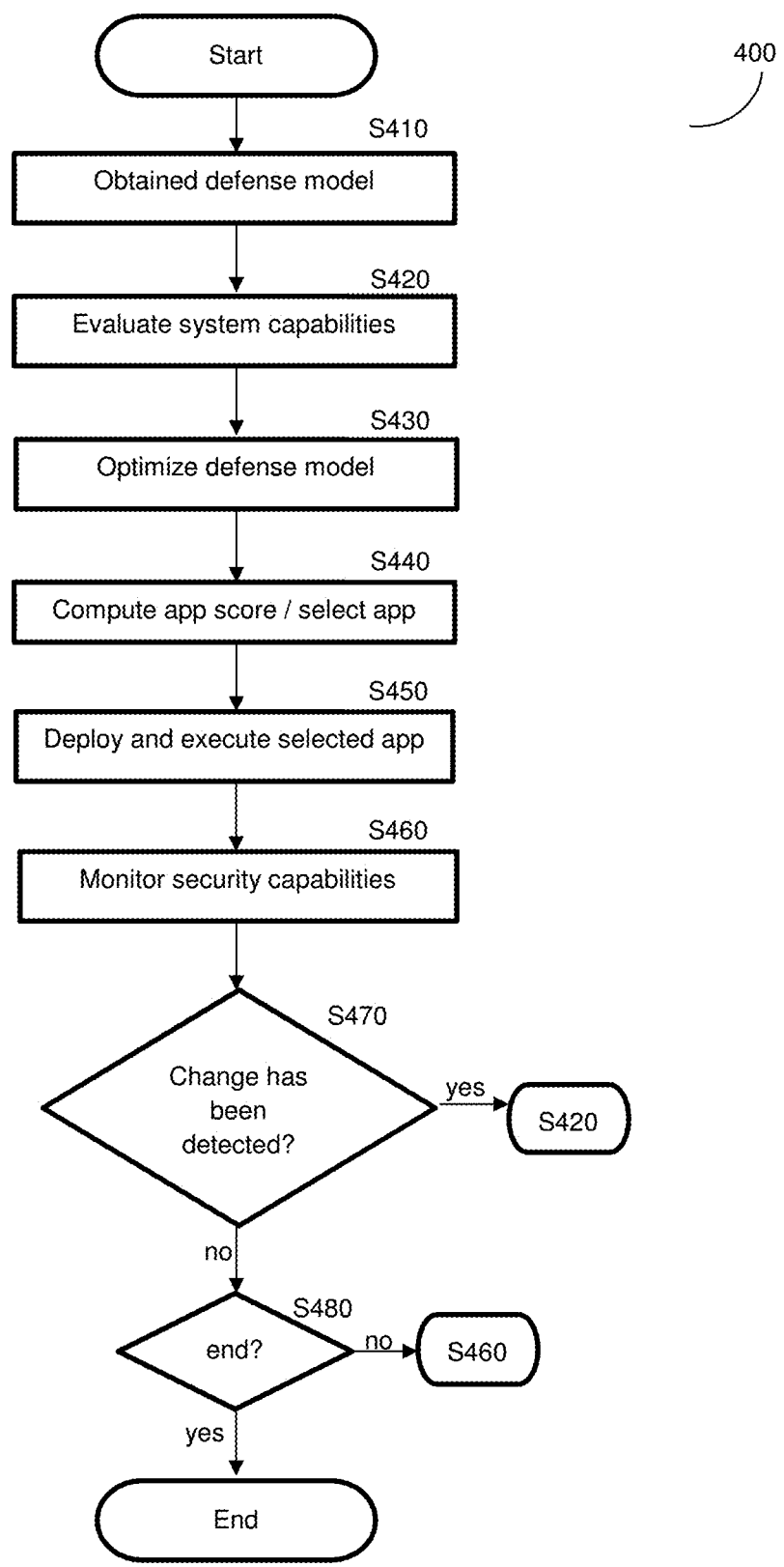
FIG. 4 is a flowchart illustrating a method for creating and optimizing a security application according to one embodiment.

FIG. 4 shows an example flowchart 400 illustrating a method for creating and optimizing security applications to protect against cyber threats according to an embodiment.

At S410, a defense model is obtained. In an embodiment, the defense model is obtained from a central repository. In another embodiment, the defense model may be created or uploaded by a user. In yet another embodiment, the defense model can be obtained from a module or a system configured to generate a defense model in response to a detected threat. As noted above, the defense model defines an optimal defense behavior of a security platform with respect to a certain threat. To this end, the defense model may designate one or more security capabilities (products and/or engines) required to achieve the optimal defense.

At S420, the current available security capabilities are determined and evaluated. In an embodiment, S420 results with a list (or a table, e.g., a capabilities table) of security engines that are currently available, giving a set of product that exist in the organization, and their performance scores. A performance score is computed based on a security product classified to a respective security engine. In an embodiment, the performance score is based on any of, or combination of an offline score, a runtime score, a unified score, a SNR of the engine, or a combination thereof. An offline score is based on the security-rules defined in an attack database (not shown) of a respective security product. A runtime score is generated based on attack logs provided by a security product. A unified score is at least based on the offline and runtime scores. An embodiment to compute the SNR (signal to noise) of an engine is discussed in detail above. The computation of a performance score is further discussed with reference below and in the above-referenced application Ser. No. 15/227,571.

At S430, based on the current available security capabilities, the defense model is optimized. In an embodiment, S430 includes creating one more security applications, each of which is a variant of a base security application. The base security application defines the defense model.

As discussed in detail above, if the base security application defines the optimal set of security engines, each variant may include a subset of and/or alternative of such engines. In an example embodiment, the alternative security engines are selected based on a mapping table. An example for a mapping table is provided above.

As further noted above, the removal of the security engine is performed while maintaining the logical structure of the base security application, and consequently maintaining the logical structure of the defense model.

At S440, a quality application score (app_score) for each variant application is determined. In an embodiment, the quality score is a product of all performance scores of each security engines. Other techniques for computing the app_score may be utilized without departing from the scope of the disclosed embodiments.

In an embodiment, S440 further includes selecting, based on the app_score, a single security application from the variants of the create security applications. For example, an application having the highest app_score may be selected. In an embodiment, the selected application should also demonstrate an app_score higher than a predefined threshold. In an embodiment, all created applications with an app_score higher than a predefined threshold are saved in the central repository.

At S450, the selected security application is deployed and executed. When executed, the selected security application can protect an entity in the enterprise against a specific cyber threat. This includes detection, investigation, and/or mitigation. For example, an executed security application may be configured to perform a ransomware attack campaign detection and mitigation, intelligence gathering detection and mitigation, insider threat detection and mitigation, data-leaks, and so on. A deployment of a security application may include configuration of the relevant security products. Such configuration may include enabling or displaying security products or some functionalities therein. It should be noted that more than one application can be selected.

At S460, at least the security capabilities utilized in the deployed security application are monitored to detect any changes in the functionality. For example, if a security product is currently dysfunctional or its performance has been degraded. In yet another embodiment, it is checked if missing capabilities (engines) are now available. At S470, it is checked if at least one changed has been detected, and if so execution returns to S420 for reevaluation of the capabilities; otherwise, execution continues with S480.

At S480, it is checked if execution should end, e.g., in response to a user request, end of a detected attack, and so on. If so, execution ends; otherwise, execution returns to S460.

It should be noted that the method discussed with reference to FIG. 4 is performed for each defense model. Thus, an optimization of a plurality of models in parallel is possible.

Figure 5:
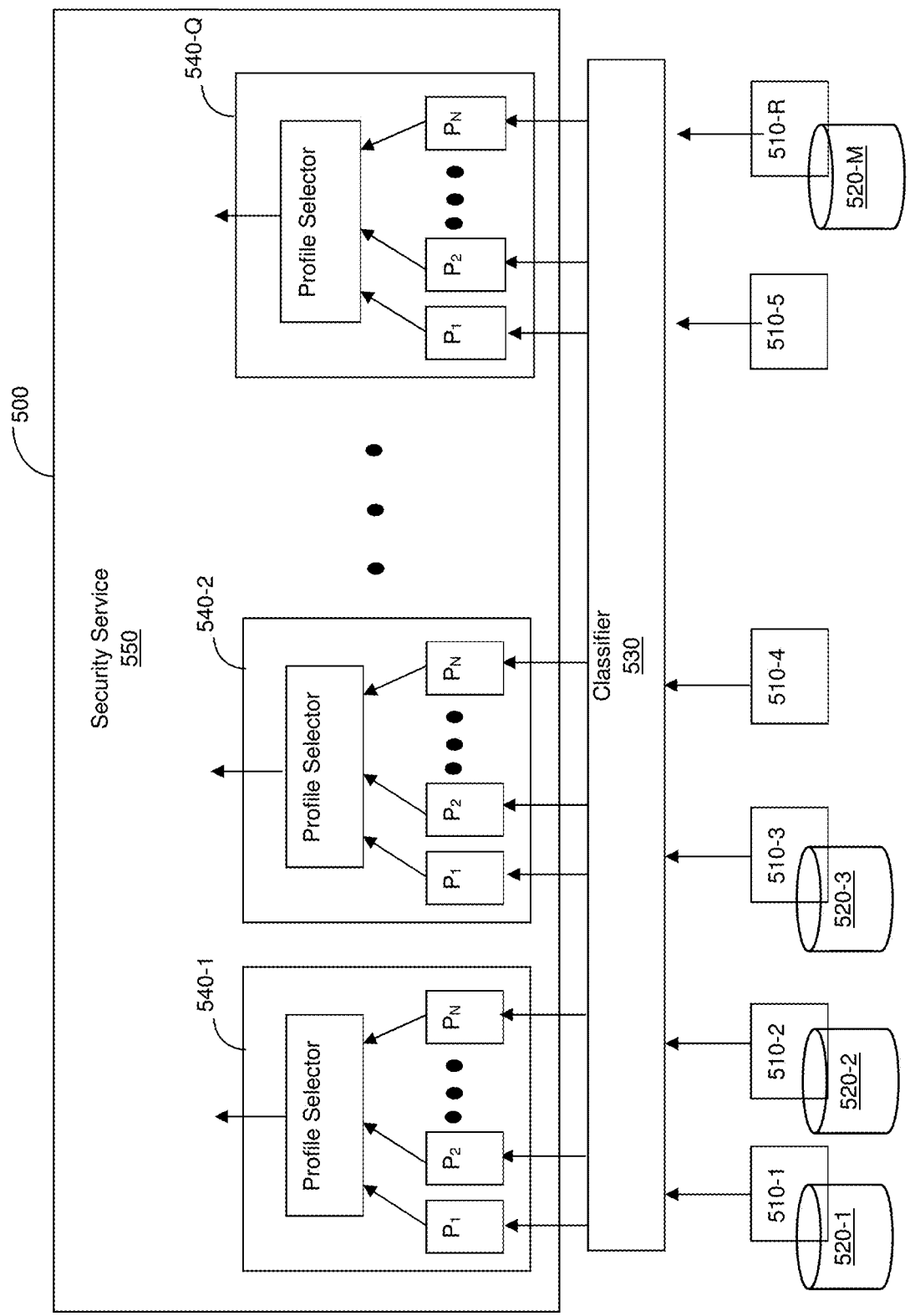
FIG. 5 is a diagram of a security service demonstrating the computation of the performance scores according to an embodiment.

FIG. 5 illustrates an example diagram of a security service 500 demonstrating the computation of the performance scores according to an embodiment. In the example shown in FIG. 5, a plurality of security products 510-1 through 510-R (hereinafter referred to individually as a security product 510 and collectively as security products 510, merely for simplicity purposes), some of which include an attack database of the attack databases 520-1 through 520-M, are analyzed by the security system 550. The rules in the databases 520-1 through 520-M are classified by a classifier 530 configured to generate product profiles ($P_1$, through $P_N$) stored in each of the security engines 540-1 through 540-Q (hereinafter referred to individually as a security engine 540 and collectively as security engines 540, merely for simplicity purposes) of a security service 550. In additional, attack logs output, in runtime, by the security products 510-1 through 510-R are also classified by a classifier 530 into the generated product profiles ($P_1$, through $P_N$).

Each security engine 540 is further configured to select a profile, and hence a security product, that demonstrates the best performance for handling a specific cyber-threat. Each security engine 540 can apply different selection criteria as discussed in greater detail below. A security engine 540 is configured to generate one or more of the offline, runtime, and unified scores.

The offline score is based on the security-rules defined in an attack database of a respective product. As such attack databases are typically populated with rules, the score can be computed as an offline process and not based on the runtime operation of a security product 510. It should be noted that as the security rules in an attack database are updated, added, or removed, a new offline score is generated.

The runtime score is generated or computed based on attack logs output by a security product 510. The attack logs are generated at runtime, i.e., when the security product 510 is active in detecting and/or investigating, of an on-going attack. In some embodiments, a security engine 540 can also generate a unified score based on the off-line and runtime scores.

It should be noted that, for some security services, only a run-time score is generated. For example, run-time scores may only be generated for security products 510 having an attack database with security rules that frequently change or services that do not operate on security rules. Each runtime or offline score can quantify the risk, or accuracy, or impact, threat coverage, or any combination thereof.

Each security engine 540 is configured to generate performance score(s) for handling a specific cyber-threat of a specific cyber-solution category. For example, the security service 550 belongs to an IDS cyber-solution category and the security engines 540 can individually handle the following types of threats: privilege escalation, network scan, and brute-force types of threats.

Figure 6:
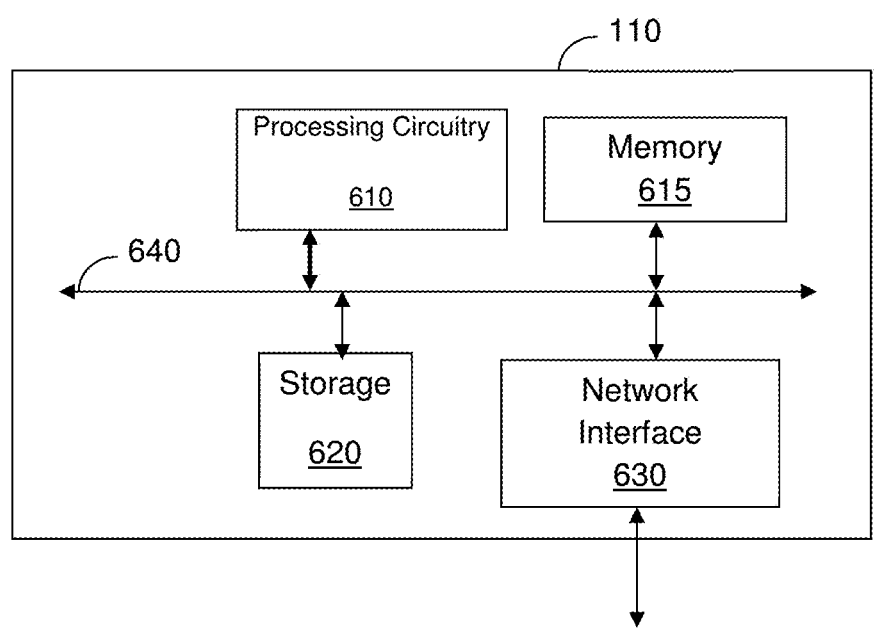
FIG. 6 is a hardware block diagram of a security stack system implemented according to an embodiment.

As another example, the security service 550 belongs to a reputation analysis category and the security engines 540 can individually handle the following types of threats: phishing web-sites, malware web-sites, and command and control web-sites. FIG. 6 shows an example block diagram of the system 110 according to another embodiment. The system 110 includes a processing circuitry 610, a memory 615, a storage 620, and a network interface 630, all connected to a computer bus 640.

The processing circuitry 610 may be realized by one or more hardware logic components and circuits. Examples for such hardware logic components and circuits are provided above. The memory 615 may be volatile, non-volatile, or a combination thereof. The storage 620 may be magnetic storage, optical storage, and the like.

In one configuration, computer readable instructions to implement one or more embodiments disclosed herein may be stored in the storage 620. The storage 620 may also store other computer readable instructions to implement an operating system, an application program, and the like. Computer readable instructions may be loaded in the memory for execution by the processing circuitry 610. The computer readable instructions, when executed, causes the processing circuitry 610 to perform the process for creating and optimizing security applications to protect against cyber threats and cyber-attacks as discussed in detail herein above.

In another embodiment, the storage 620, the memory 615, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various functions described herein with respect to at least create and optimize security applications.

According to some embodiments, the storage 620 may be utilized to store at least defense models, variant of created applications, capabilities table, and the mapping table.

The network interface 630 may include a wired connection or a wireless connection. The network interface 630 may be utilized to transmit communications media, to receive communications media, or both. In an embodiment, the network interface 630 provides an interface layer of the system 110. Such communication can be with SDN-based network elements or "legacy" network elements (not shown) in the network 120.

The network interface 630 supports bidirectional communication drivers to allow communication with the data-plane elements including configurations, policy reading, and logs collection. The drivers support different forms of communication standards and vendors' defined interfaces such as, but not limited to, Netconf, Netflow, BGP, BGP flow spec, SSH, CLIs, DB APIs and more. The drivers enable communication with middle-box devices (e.g., L4-L7 devices and security devices, DPI devices, etc.), end point devices (mobile, host-based security applications), server applications, management systems of these devices, combinations thereof, and so on. The network interface 1030 also interfaces with the plurality of security products designed to protect against different cyber threats. The computer bus 640 may be, for example, a PCIe bus.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing a defense model using available security capabilities, comprising:
    obtaining a defense model, wherein the defense model defines a defense behavior with respect to an identified threat;
    obtaining a security application implementation of the defense model comprising a probability of success above a predetermined value, wherein an optimal security application implementation defines an optimal set of security engines;
    evaluating available security capabilities deployed in an enterprise environment to determine a plurality of variant security applications implementing the defense model by generating a list of currently available security engines and their respective quality scores based on a performance score of each security engine defined in each of the variant security applications, wherein each variant security application includes at least one of a subset of the optimal set of the security engines and alternative for security engines included the optimal set of the security engines, wherein the performance score is based on at least one of an offline score determined by an attack database of a respective security product, a runtime score determined by attack logs provided by the respective security product, or a unified score determined by the offline score and the runtime score;
    determining a quality score for each variant security application of the plurality of variant security applications, the quality score reflecting a level of protection each variant security application offers against the identified threat;
    selecting, from the plurality of variant security applications, a variant security application having a highest quality score; and
    executing the selected variant security application to respond to the identified threat.

2. The method of claim 1, further comprising: deploying the selected variant security application in the enterprise environment.

3. The method of claim 1, wherein the defense model is predefined and stored in a data repository.

4. The method of claim 2, wherein each variant security application maintains a logical structure of the security application implementation of the defense model.

5. The method of claim 1, wherein the selected variant security application provides a unified abstract representation that is agnostic to security products used for detection and mitigation of cyber threats.

6. The method of claim 1, further comprising:
monitoring the available security capabilities periodically during the execution of the selected variant security application to identify any changes; and
optimizing the selected variant security application during the execution when changes in the available security capabilities are detected.

7. The method of claim 1, wherein the optimal set of security engines are operable in an orchestration system deployed in the enterprise environment, wherein each security engine is associate with a security capability executed by a security product deployed in the enterprise environment.

8. The method of claim 7, further comprising:
optimizing the defense model upon a failure of the security product.

9. A non-transitory computer readable medium having stored thereon instructions for causing a processing circuitry to execute a process for optimizing a defense model using available security capabilities, the process comprising:
obtaining a defense model, wherein the defense model defines a defense behavior with respect to an identified threat;
obtaining a security application implementation of the defense model comprising a probability of success above a predetermined value, wherein an optimal security application implementation defines an optimal set of security engines;
evaluating available security capabilities deployed in an enterprise environment to determine a plurality of variant security applications implementing the defense model by generating a list of currently available security engines and their respective quality scores based on a performance score of each security engine defined in each of the variant security applications, wherein each variant security application includes at least one of a subset of the optimal set of the security engines and alternative for security engines included the optimal set of the security engines, wherein the performance score is based on at least one of an offline score determined by an attack database of a respective security product, a runtime score determined by attack logs provided by the respective security product, or a unified score determined by the offline score and the runtime score;
determining a quality score for each variant security application of the plurality of variant security applications, the quality score reflecting a level of protection each variant security application offers against the identified threat;
selecting, from the plurality of variant security applications, a variant security application having a highest quality score; and
executing the selected variant security application to respond to the identified threat.

10. A system for optimizing a defense model using available security capabilities, comprising:
a processing circuitry; and
a memory coupled to the processing circuitry, the memory contains therein instructions that when executed by the processing circuitry configure the system to:
obtain a defense model, wherein the defense model defines a defense behavior with respect to an identified threat;
obtain a security application implementation of the defense model comprising a probability of success above a predetermined value, wherein an optimal security application implementation defines an optimal set of security engines;
evaluate available security capabilities deployed in an enterprise environment to determine a plurality of variant security applications implementing the defense model by generating a list of currently available security engines and their respective quality scores based on a performance score of each security engine defined in each of the variant security applications, wherein each variant security application includes at least one of a subset of the optimal set of the security engines and alternative for security engines included the optimal set of the security engines, wherein the performance score is based on at least one of an offline score determined by an attack database of a respective security product, a runtime score determined by attack logs provided by the respective security product, or a unified score determined by the offline score and the runtime score;
determine a quality score for each variant security application of the plurality of variant security applications, the quality score reflecting a minimum level of protection each variant security application offers against the identified threat;
select, from the plurality of variant security applications, a variant security application having a highest quality score; and
execute the selected variant security application to respond to the identified threat.

11. The system of claim 10, wherein the system is further configured to:
deploy the selected variant security application in the enterprise environment.

12. The system of claim 10, wherein the defense model is predefined and stored in a data repository.

13. The system of claim 11, wherein each variant security application maintains a logical structure of the security application implementation of the defense model.

14. The system of claim 10, wherein the selected variant security application provides a unified abstract representation that is agnostic to security products used for detection and mitigation of cyber threats.

15. The system of claim 10, wherein the system is further configured to:
monitor the available security capabilities periodically during the execution of the selected variant security application to identify any changes; and
optimize the selected variant security application when changes in the available security capabilities are detected.

16. The system of claim 10, wherein the security engines are operable in an orchestration system deployed in the enterprise environment, wherein each security engine is associate with a security capability executed by a security product deployed in the enterprise environment.

17. The system of claim 16, wherein the system is further configured to:
optimize the defense model upon a failure of the security product.

* * * * *